(No Model.)
A. H. OVERMAN.
RUBBER TIRE FOR WHEELS.
No. 315,537. Patented Apr. 14, 1885.
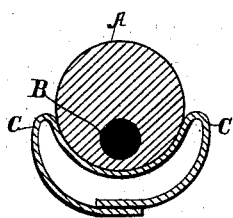
WITNESSES:
INVENTOR
BY
ATTORNEY

UNITED STATES PATENT OFFICE.

ALBERT H. OVERMAN, OF CHICOPEE, MASSACHUSETTS.

RUBBER TIRE FOR WHEELS.

SPECIFICATION forming part of Letters Patent No. 315,537, dated April 14, 1885.

Application filed January 30, 1885. (No model.)

*To all whom it may concern:*

Be it known that I, ALBERT H. OVERMAN, residing at Chicopee, in the county of Hampden and State of Massachusetts, have invented certain new and useful Improvements in Rubber Tires for Wheels; and I do declare the following to be a full, clear, and exact description of the same, reference being had to the accompanying drawings which form a part of this specification.

My invention relates to an improvement in rubber tires for vehicle-wheels, the object being to produce a tire of superior elasticity, which shall be serviceable, light, and cheap.

With these ends in view my invention consists in a rubber tire having an interior open space located near and following its periphery.

The accompanying drawing is a view in transverse section of a tire embodying my invention applied to the rim of a velocipede-wheel. The tire A is made with an interior open space, B, located near and following its inner periphery, which is inclosed by the walls C of the rim of the wheel. The location of an interior open space near the periphery of the tire renders the inherent elasticity of such portion available by providing a space into which it can be displaced under pressure or impact upon the outer periphery of the tire, whereas the inner portion of the tire has heretofore been as so much inert material, for where the outer periphery of the tire is unconfined and free to be displaced outwardly the inner periphery thereof, being confined by the walls of the rim, must be displaced inwardly, if at all, and this is what my invention provides for. Thus by providing a tire with an interior open space, in accordance with my invention, its whole bulk is made to cushion with obvious improvement in respect of its qualities for riding and service. Furthermore, the provision of a tire with an interior open space makes it cheaper and lighter, as it requires less material. Moreover, in its location near the inner periphery of the tire the space is shielded against being cut into or exposed by wear by an outlying mass of rubber forming, virtually, the bulk of the tire.

My improved tire is molded in an apparatus corresponding, essentially, to the apparatus used in making tubing, and then vulcanized.

I am aware that rubber tires having interior spaces arranged and adapted for the occupancy of devices for retaining the tires in place are not new, and hence I do not broadly claim a tire having an interior open space.

Having fully described my invention, what I claim as new, and desire to secure by Letters Patent, is—

1. A rubber tire having an open space located eccentric to its center and on the side of the rim of the wheel, for permitting the inner portion of the tire to cushion, substantially as set forth.

2. A rubber tire having an inclosed space located eccentric to its center and on the side of the rim of the wheel, for permitting the inner portion of the tire to cushion, substantially as set forth.

In testimony whereof I have signed this specification in the presence of two subscribing witnesses.

ALBERT H. OVERMAN.

Witnesses:
 E. J. NOTTINGHAM,
 GEO. F. DOWNING.